US009739333B2

(12) United States Patent
Michiyama et al.

(10) Patent No.: US 9,739,333 B2
(45) Date of Patent: Aug. 22, 2017

(54) BRACKET-EQUIPPED VIBRATION-DAMPING DEVICE

(71) Applicant: SUMITOMO RIKO COMPANY LIMITED, Komaki-shi, Aichi (JP)

(72) Inventors: Wakako Michiyama, Komaki (JP); Kenji Oki, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 15/209,031

(22) Filed: Jul. 13, 2016

(65) Prior Publication Data
US 2017/0122398 A1 May 4, 2017

(30) Foreign Application Priority Data

Oct. 30, 2015 (JP) .................. 2015-214459

(51) Int. Cl.
| *F16F 13/10* | (2006.01) |
| *B60K 5/12* | (2006.01) |
| *F16F 1/36* | (2006.01) |
| *F16F 15/08* | (2006.01) |

(52) U.S. Cl.
CPC .......... *F16F 13/103* (2013.01); *B60K 5/1208* (2013.01); *F16F 1/36* (2013.01); *F16F 13/10* (2013.01); *F16F 15/08* (2013.01); *F16F 2226/04* (2013.01)

(58) Field of Classification Search
CPC .. F16F 13/103; F16F 1/36; F16F 13/10; F16F 15/08; F16F 2226/04; B60K 5/1208
USPC ....................... 267/140.13, 140.11
See application file for complete search history.

(56) References Cited

U.S. PATENT DOCUMENTS

| 6,435,488 | B1 * | 8/2002 | Simuttis | F16F 13/18 267/140.14 |
| 7,341,244 | B1 * | 3/2008 | Adams | F16F 1/54 267/140.13 |
| 8,016,274 | B2 * | 9/2011 | Adams | F16F 13/268 248/562 |
| 8,403,097 | B2 * | 3/2013 | Joly | F16F 1/373 180/291 |
| 2005/0098374 | A1 | 5/2005 | Moon | |

(Continued)

FOREIGN PATENT DOCUMENTS

FR 2 810 712 A1 12/2001

*Primary Examiner* — Thomas J Williams
*Assistant Examiner* — Mariano Sy
(74) *Attorney, Agent, or Firm* — Oliff PLC

(57) ABSTRACT

A bracket-equipped vibration-damping device including: a vibration-damping device main unit including first and second mounting members disposed separately from each other vertically and connected by a main rubber elastic body mutually and elastically; and a bracket mounted to the device main unit in a state that the bracket is fixed to the second mounting member inserted into the bracket laterally. A guide part of the second mounting member is inserted into a guide groove of the bracket extending in an insertion direction to be positioned vertically. The bracket includes a compression wall surface superposed to at least one of upper and lower end surfaces of the device main unit. A groove width inner surface of the guide groove opposite vertically to the compression wall surface is tilted to the compression wall surface so that the surfaces approach each other vertically toward the insertion direction.

6 Claims, 9 Drawing Sheets

(56) References Cited

U.S. PATENT DOCUMENTS

| | | | |
|---|---|---|---|
| 2005/0285318 A1* | 12/2005 | Winkler | F16F 13/105 |
| | | | 267/140.13 |
| 2010/0264570 A1 | 10/2010 | Thierry et al. | |
| 2011/0024960 A1* | 2/2011 | Bradshaw | F16F 13/262 |
| | | | 267/140.13 |
| 2011/0291335 A1* | 12/2011 | Rooke | F16F 13/268 |
| | | | 267/140.13 |
| 2012/0318951 A1* | 12/2012 | Hermann | F16F 13/103 |
| | | | 248/565 |
| 2013/0292889 A1* | 11/2013 | Power | F16F 13/106 |
| | | | 267/140.13 |
| 2014/0284857 A1* | 9/2014 | Kim | F16F 13/08 |
| | | | 267/140.14 |
| 2015/0054209 A1* | 2/2015 | Eckel | F16F 13/08 |
| | | | 267/140.14 |
| 2015/0252866 A1 | 9/2015 | Muraoka et al. | |
| 2016/0238102 A1* | 8/2016 | Goto | B60K 5/1208 |

* cited by examiner

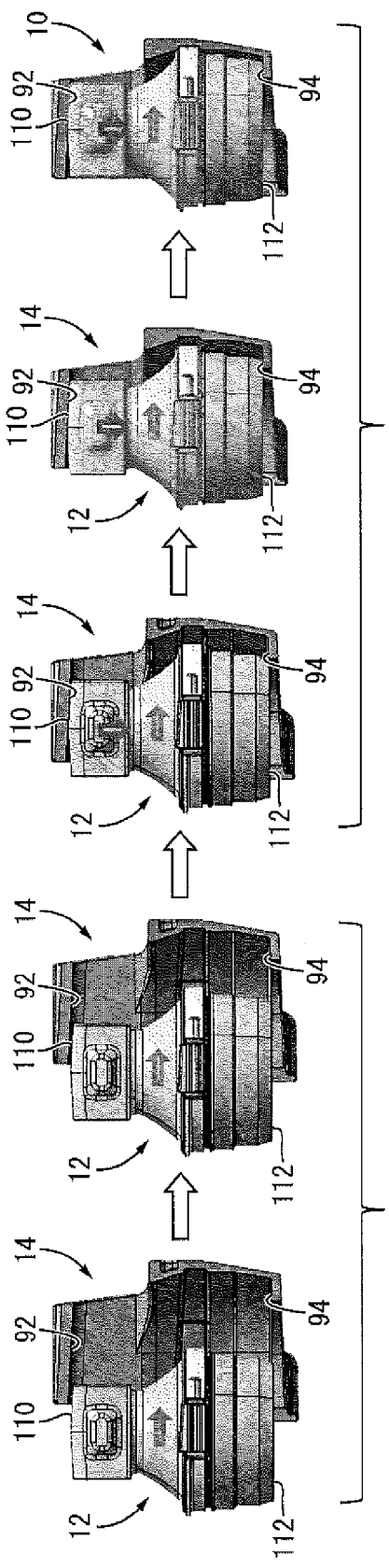

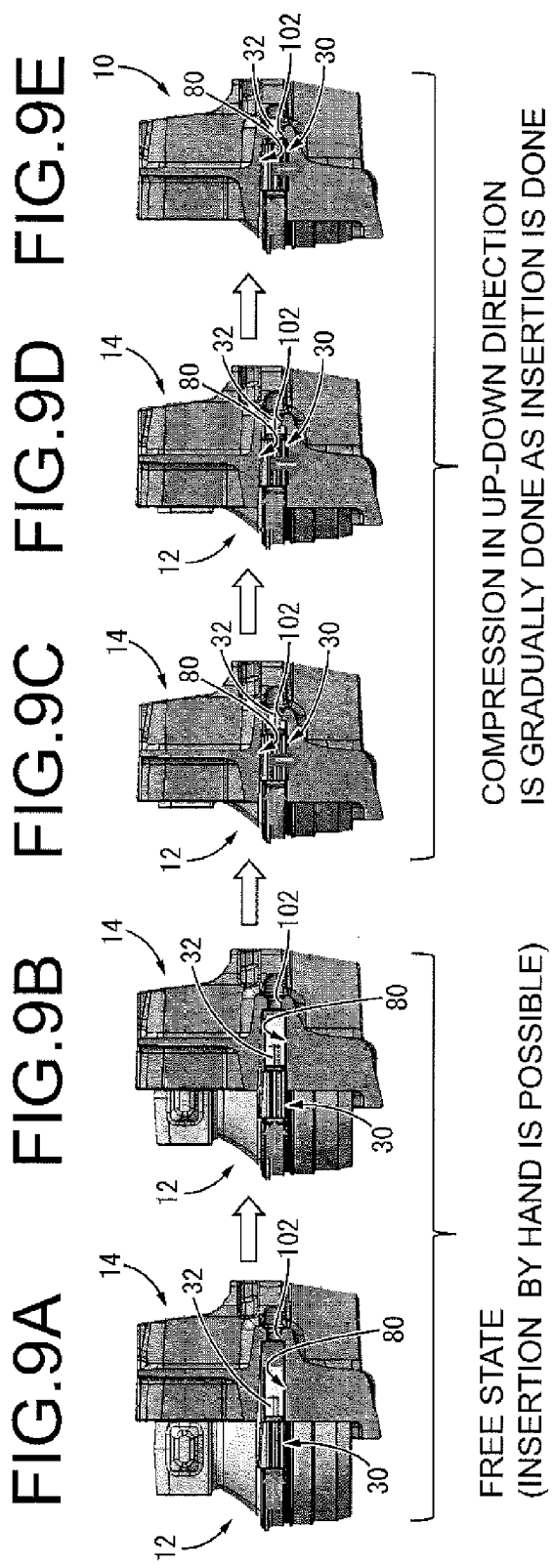

BRACKET-EQUIPPED VIBRATION-DAMPING DEVICE

INCORPORATED BY REFERENCE

The disclosure of Japanese Patent Application No, 2015-214459 filed on Oct. 30, 2015 including the specification, drawings and abstract is incorporated herein by reference in its entirety.

BACKGROUND OF THE INVENTION

1. Field of the Invention

The present invention relates to a bracket-equipped vibration-damping device, which is applicable as an engine mount of an automobile or the like.

2. Description of the Related Art

From the past, a vibration-damping device is known as one type of vibration-damping support body or vibration-damping connecting body disposed between components constituting a vibration transmission system to connect those constituent components of the vibration transmission system to each other in a vibration-damping manner. Such a vibration-damping device is applied to an automotive engine mount or the like for example. This vibration-damping device has a vibration-damping element wherein a second strength member and a first strength member that are separate in the up-down direction are mutually connected in a vibration-damping manner by an elastomer body, for example as disclosed in U.S. Publication No. US 2010/0264570 and the like.

Also disclosed in US 2010/0264570 is a bracket-equipped vibration-damping device wherein the vibration-damping element is equipped with a support. The support includes sliders extending in the lateral direction and ribs provided for the first strength member are inserted and guided into the sliders. In this way, the first strength member is inserted into the support in the lateral direction so as to be fixed, so that the vibration-damping element is equipped with the support.

Incidentally, for the vibration-damping device, axial pre-compression is generally performed on the elastomer body, in order to reduce tensile stress of the elastomer body with the aim of improving durability. Moreover, in the case where the vibration-damping element has a fluid-filled structure including a chamber with a liquid sealed inside, in order to secure fluidtightness of the chamber, it is general to clamp a seal body like a rubber that is disposed between components constituting the wall of chamber axially between the constituent components of the wall for sealing.

However, so as to apply the vertical pre-compression on the elastomer body in the structure of US 2010/0264570, it is necessary, upon attachment of the vibration-damping element on the support, to insert the first strength member into the support while applying a force in the approaching direction between the second strength member and the first strength member. This leads to a problem of difficulty in manufacture.

Additionally, when adopting the fluid-filled vibration-damping element, it is required to complete the sealing step in advance of the attachment of the support on the vibration-damping element, or to constitute the device by attaching a fluid-filled structure to the support separately from the vibration-damping element like French Patent Publication No. FR 2810712, alternatively. Each case needs another step for sealing and hardly avoid an increase in the number of the manufacturing steps.

SUMMARY OF THE INVENTION

It is therefore one object of the present invention to provide a bracket-equipped vibration-damping device of novel structure which is able to readily and precisely exert a force in the up-down direction required for pre-compression of a main rubber elastic body and sealing of a fluid chamber in a fluid-filled structure so as to obtain a target performance.

The above and/or optional objects of this invention may be attained according to at least one of the following modes of the invention. The following modes and/or elements employed in each mode of the invention may be adopted at any possible optional combinations.

Specifically, a first mode of the present invention provides a bracket-equipped vibration-damping device comprising: a vibration-damping device main unit comprising: a first mounting member and a second mounting member being disposed separately from each other vertically; and a main rubber elastic body elastically connecting the first mounting member and the second mounting member to each other; and a bracket mounted to the vibration-damping device main unit in a state that the bracket is fixed to the second mounting member, which is inserted into the bracket in a lateral direction, wherein the second mounting member has a guide part, while the bracket has a guide groove extending in a direction of insertion of the second mounting member into the bracket, and the guide part is inserted into the guide groove in order to be positioned vertically, and the bracket includes a compression wall surface which is superposed to at least one of upper and lower end surfaces of the vibration-damping device main unit, and a groove width inner surface of the guide groove on an opposite vertical side to the compression wall surface is tilted relative to the compression wall surface so that the groove width inner surface of the guide groove and the compression wall surface approach each other vertically toward the direction of insertion of the second mounting member into the bracket.

With the bracket-equipped vibration-damping device constituted according to the first mode of this invention, the compression wall surface and the groove width inner surface of the guide groove in the bracket approach to each other toward the direction of insertion of the vibration-damping device main unit into the bracket, whereby the vibration-damping device main unit is gradually compressed vertically between the compression wall surface and the groove width inner surface of the guide groove, as the vibration-damping device main unit is inserted into the bracket. Thus, in the case of requiring vertical compression of the vibration-damping device main unit, it is not necessary to perform compression work in advance on the vibration-damping device main unit before being equipped with the bracket. In addition, since the vibration-damping device main unit is inserted into the bracket from the side where the compression wall surface and the guide width inner surface of the guide groove are separate, it is not necessary to insert the vibration-damping device main unit into the bracket while exerting vertical compression force on the vibration-damping device main unit.

Moreover, the guide part of the second mounting member is inserted into the guide groove of the bracket so as to be engaged therewith vertically, thereby preventing vertical displacement of the second mounting member in relation to the bracket in the vertical compression of the vibration-damping device main unit between the compression wall surface and the groove width inner surface of the guide groove in the bracket. This enables the target vertical compression force to act separately on each vertical side of the second mounting member in the vibration-damping device main unit.

A second mode of the present invention provides the bracket-equipped vibration-damping device according to the first mode, wherein the groove width inner surface of the guide groove is tilted relative to the direction of insertion of the second mounting member into the bracket so as to approach the compression wall surface positioned on the opposite vertical side toward the direction of insertion, while a surface of the guide part corresponding to the groove width inner surface of the guide groove is tilted in the same direction as the groove width inner surface of the guide groove.

According to the second mode, in a bracket-equipped state where the guide width inner surface of the guide groove and the surface of the guide part corresponding thereto are in contact, rattling between the vibration-damping device main unit and the bracket is prevented, while the guide part is avoided from being dislodged out of the guide groove more easily. Also, upon insertion of the vibration-damping device main unit into the bracket, the guide part is in planar contact with the tilted surface of the guide groove, so that guiding and insertion are done with greater stability of the vibration-damping device main unit and the bracket.

A third mode of the present invention provides the bracket-equipped vibration-damping device according to the first or second mode, further comprising a covering rubber bonded on a surface of the guide part.

According to the third mode, the guide part is press-fit into the guide groove so as to make dislodgement of the guide part from the guide groove difficult, thereby enabling prevention of the dislodgement of the vibration-damping device main unit from the bracket. Especially even in the case where it is difficult to secure the guide part press-fit into the guide groove directly due to reasons in strength, dimension accuracy, or and the like, it is possible to press-fit the guide part into the guide groove by having a covering rubber interposed between the guide part and the guide groove.

A fourth mode of the present invention provides the bracket-equipped vibration-damping device according to any one of the first to third modes, wherein the guide part of the second mounting member includes a swage pin protruding in the direction of insertion, while the guide groove of the bracket includes a swage hole corresponding to the swage pin in an insertion end wall of the guide groove, and a tip part of the swage pin is fixed to an opening peripheral part of the swage hole by swaging with the swage pin being inserted in the swage hole.

According to the fourth mode, the swage pin is engaged with the opening peripheral part of the swage hole, thereby avoiding the dislodgement of the guide part from the guide groove, so that the state of the vibration-damping device main unit being equipped with the bracket can be kept with high reliability. Also, owing to the structure wherein the swage pin is inserted into the swage hole and they are fixed by swaging, it is easy to insert the swage pin into the swage hole compared with press-fitting, whereby the peripheral parts of the swage pin and the swage hole are rarely damaged in insertion, and deficient assembly due to dimensional error seldom occurs.

A fifth mode of the present invention provides the bracket-equipped vibration-damping device according to any one of the first to fourth modes, wherein the vibration-damping device main unit further comprises: a fluid chamber whose wall is partially constituted by the main rubber elastic body with a non-compressible fluid sealed therein; and a compression member disposed on a vertical side of the second mounting member opposite to the first mounting member, the groove width inner surface in the guide groove of the bracket on a side of the first mounting member is tilted relative to the direction of insertion of the second mounting member into the bracket, while the compression wall surface on a side of the compression member expands in the direction of insertion, and the groove width inner surface of the guide groove and the compression wall surface approach each other toward the direction of insertion, and the vibration-damping device main unit is equipped with the bracket in a state that a lower end surface of the compression member that is the lower end surface of the vibration-damping device main unit is in contact with the compression wall surface so that a seal body disposed between the second mounting member and the compression member is clamped between the second mounting member and the compression member to constitute a seal structure of the fluid chamber.

According to the fifth mode, by inserting the vibration-damping device main unit into the bracket in the lateral direction, it is possible to exert vertical compression force on the seal body between the second mounting member and the compression member, and fluidtightness of the fluid chamber can be secured without especially providing a sealing step (a vertical compression step of the seal body). Additionally, since the second mounting member is positioned vertically in relation to the bracket that exerts compression force, the compression force is efficiently applied to the seal body without being absorbed due to elastic deformation of the main rubber elastic body, so that the target seal performance can be obtained stably.

A sixth mode of the present invention provides the bracket-equipped vibration-damping device according to any one of the first to fifth modes wherein the compression wall surface of the bracket on a side of the first mounting member is tilted relative to the direction of insertion of the second mounting member into the bracket so as to approach the groove width inner surface of the guide groove on an opposite side to the first mounting member toward the direction of insertion of the second mounting member into the bracket, and the vibration-damping device main unit is equipped with the bracket in a state that the upper end surface of the vibration-damping device main unit that is on the side of the first mounting member is in contact with the compression wall surface and the main rubber elastic body is compressed vertically in advance.

According to the sixth mode, by inserting the vibration-damping device main unit into the bracket in the lateral direction, the main rubber elastic body is compressed vertically in advance, so that the durability of the main rubber elastic body is improved owing to pre-compression without especially providing a pre-compression step of the main rubber elastic body. Moreover, since the second mounting member is positioned vertically in relation to the bracket that exerts the compression force, it is possible to avoid the compression force from being absorbed due to deformation of other elastic bodies including the seal body, thereby realizing the target pre-compression stably.

According to the present invention, the vibration-damping device main unit is equipped with the bracket by inserting the main unit into the bracket in the lateral direction, thereby enabling the bracket to exert vertical compression force on the vibration-damping device main unit. Moreover, since the guide part of the second mounting member is inserted into the guide groove of the bracket in order to vertically position the second mounting member relative to the bracket, it is possible to apply the compression force separately on each vertical side of the second mounting member.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIGS. 8A to 8E are views showing a mounting step of the bracket on the mount main unit and showing the bracket with a cross section corresponding to FIG. 2; and FIGS. 9A to 9E are views showing the mounting step of the bracket on the mount main unit and showing the bracket with a cross section corresponding to FIG. 7.

DETAILED DESCRIPTION OF PREFERRED EMBODIMENTS

Figure 1:
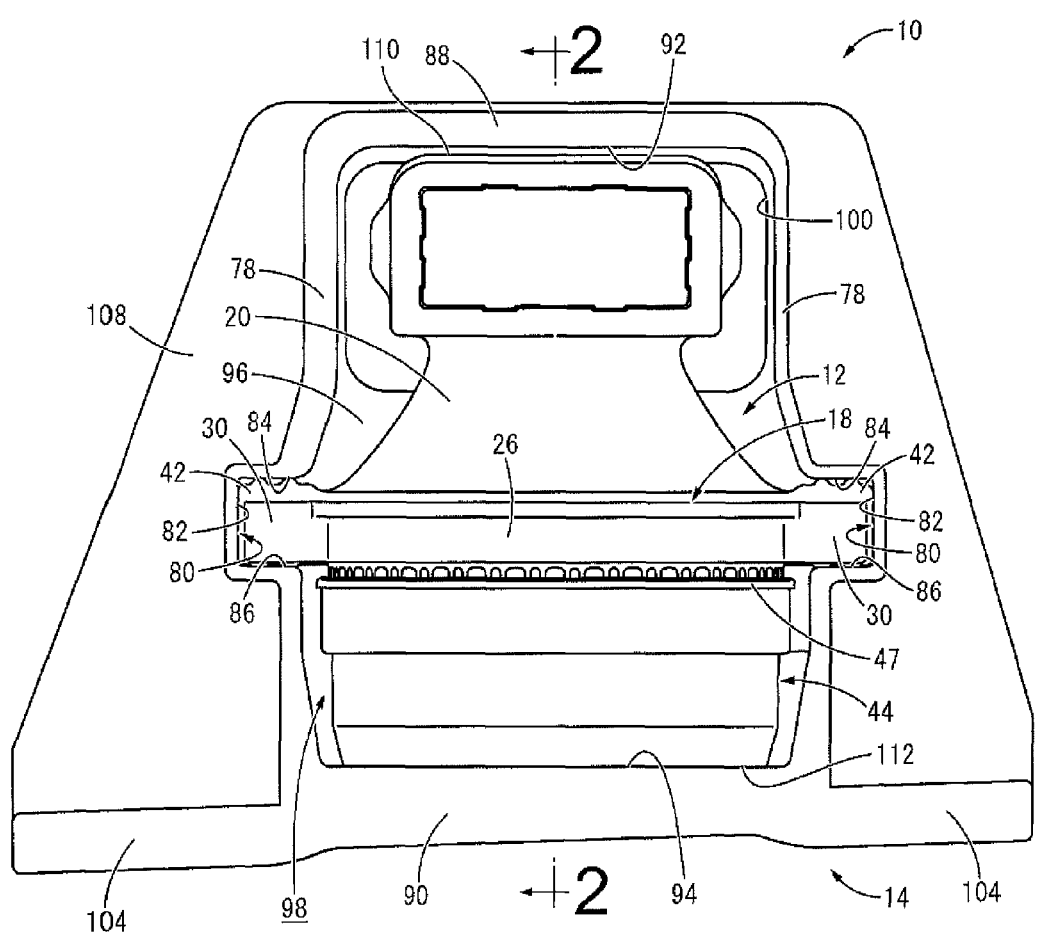
FIG. 1 is a front view showing a bracket-equipped vibration-damping device in the form of an engine mount as a first embodiment of the present invention.

There will be described an embodiment of the present invention while referring to the drawings.

Figure 2:
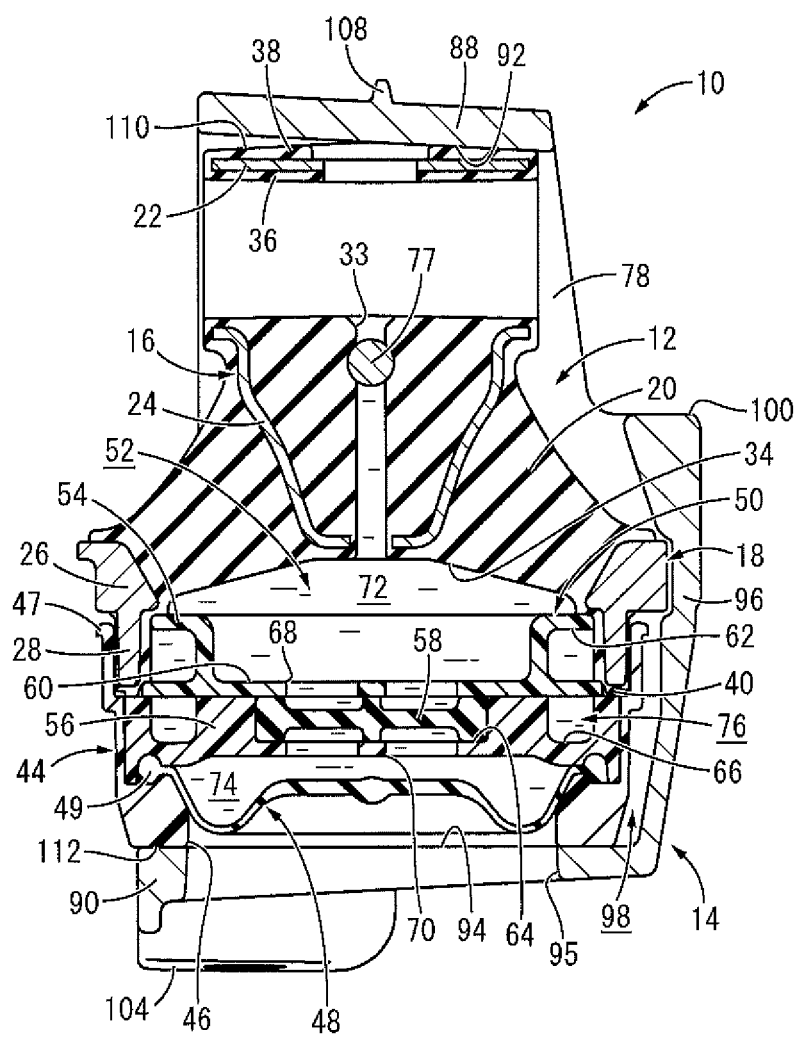
FIG. 2 is a cross sectional view taken along line 2-2 of FIG. 1.
Figure 5:
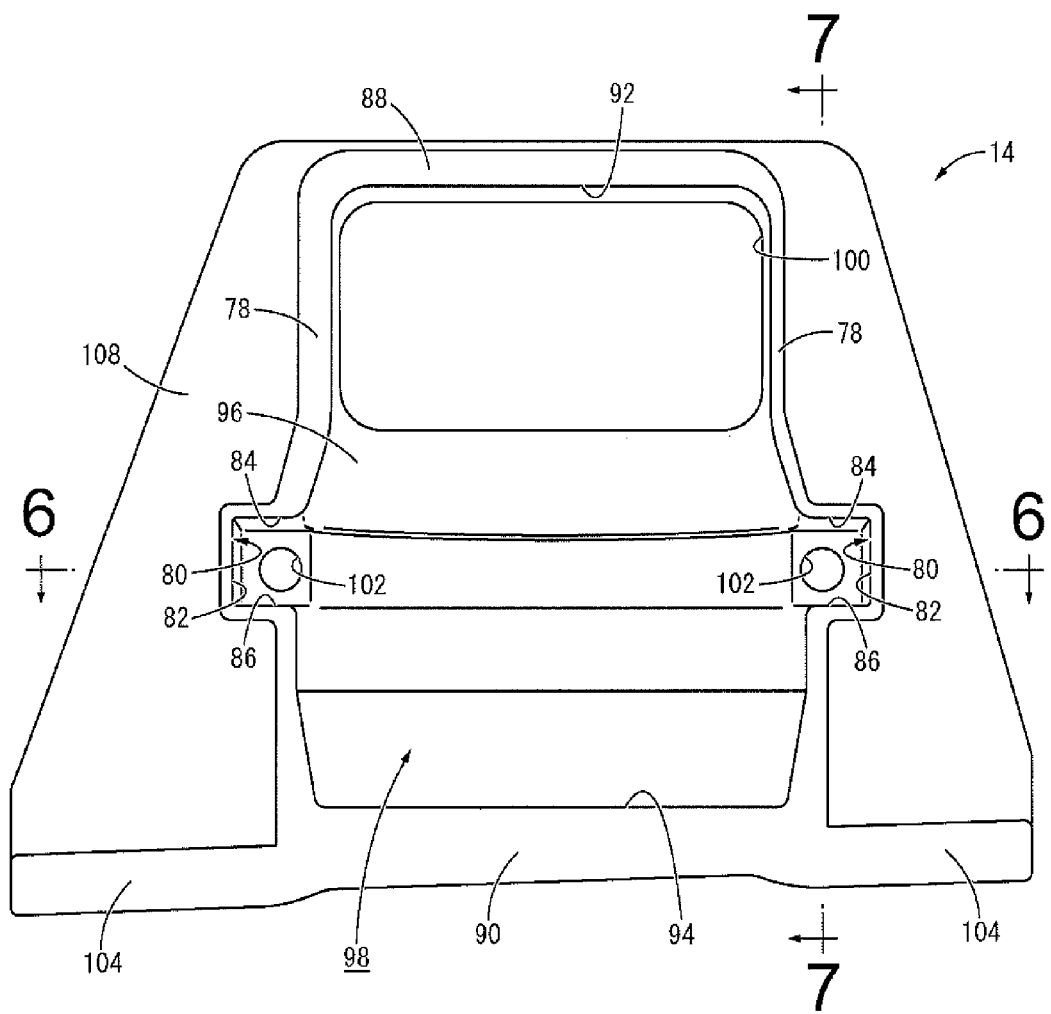
FIG. 5 is a front view of a bracket of the engine mount shown in FIG. 1.
Figure 6:
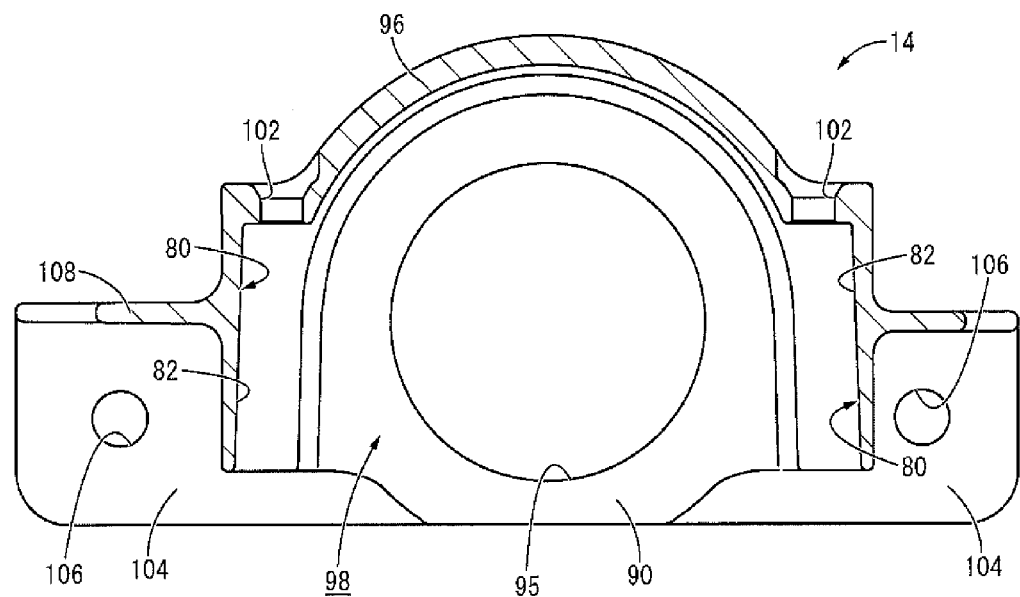
FIG. 6 is a cross sectional view taken along line 6-6 of FIG. 5.

FIGS. 1 and 2 show an automotive engine mount 10 as a first embodiment of a vibration-damping device in a structure according to the present invention. The engine mount 10 has a structure wherein, to a mount main unit 12 as a vibration-damping device main unit shown in FIGS. 3 and 4, a bracket 14 shown in FIGS. 5 and 6 is mounted. In this embodiment, the up-down direction means the up-down direction in FIG. 1, which is the main direction of a vibration input and the roughly vertical direction in a state of the engine mount being mounted to a vehicle. In addition, the left-right direction means the left-right direction in FIG. 2, which is roughly the vehicle's left-right direction in the state of the engine mount being mounted to the vehicle. Meanwhile, the front-back direction means the left-right direction in FIG. 1, which is roughly the vehicle's front-back direction in the state of the engine mount being mounted to the vehicle.

Figure 3:
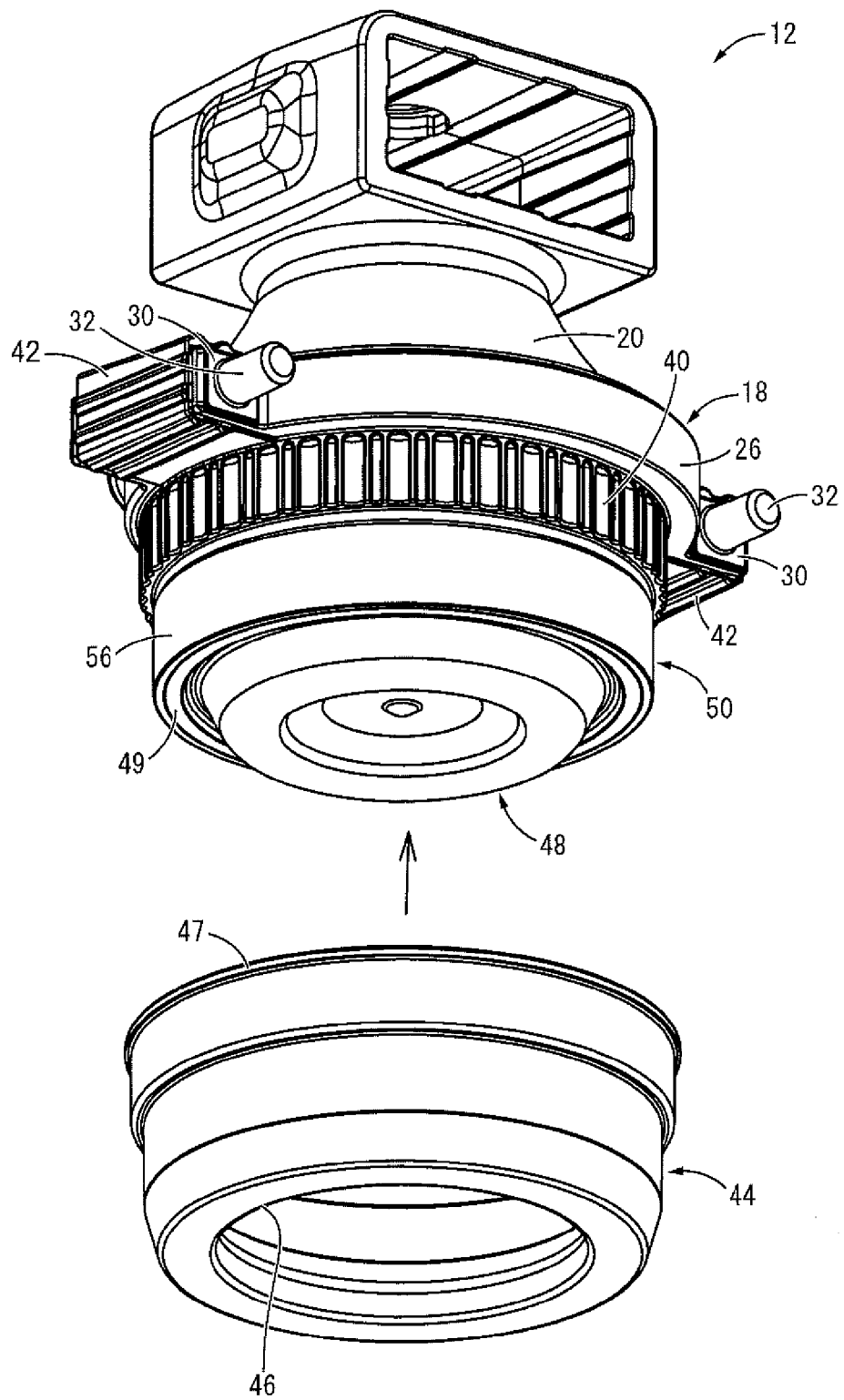
FIG. 3 is a perspective view of a mount main unit of the engine mount shown in FIG. 1, showing a state before mounting a cup member thereon.
Figure 4:
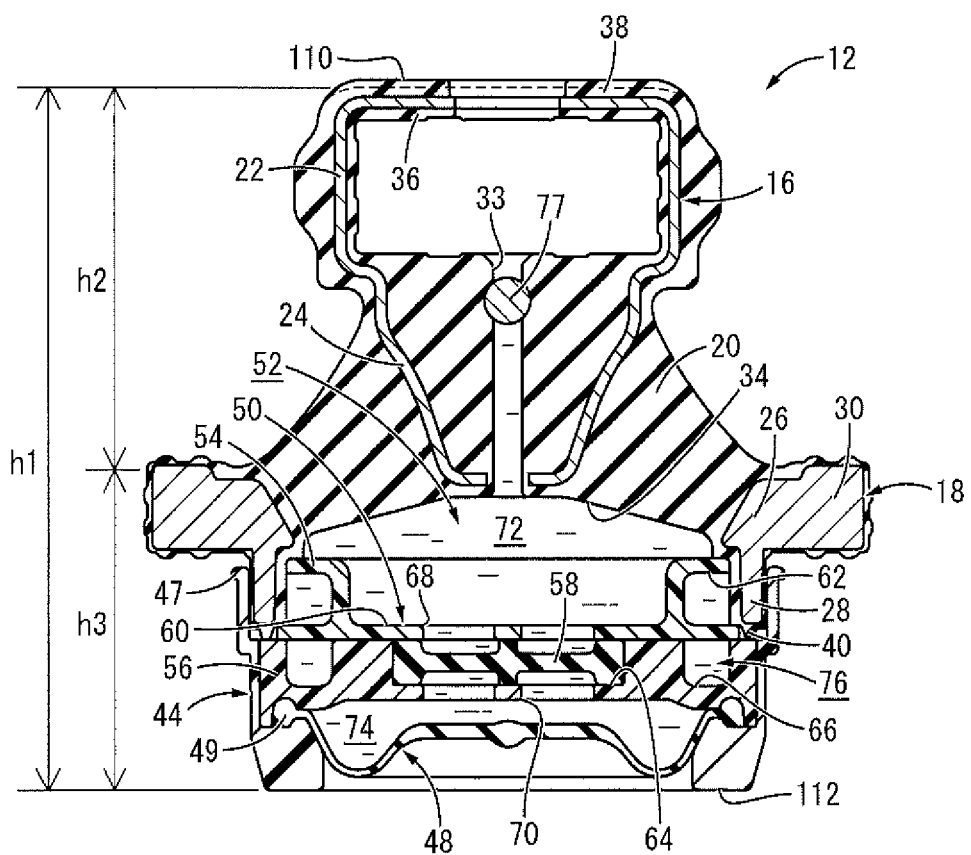
FIG. 4 is a longitudinal cross sectional view of the mount main unit shown in FIG. 3.

More specifically, the mount main unit 12 has a structure wherein a first mounting member 16 and a second mounting member 18 are disposed separately from each other in the up-down direction and connected to each other elastically by a main rubber elastic body 20, as shown in FIGS. 2 and 4. FIG. 3 shows the mount main unit 12 in a perspective way, in a state of the mount main unit 12 before a cup member 44 described later is mounted on the second mounting member 18 in order to make it easily understandable.

The first mounting member 16 is a rigid member formed of a metal, a synthetic resin or the like including a tubular part 22 in an approximate shape of a rectangular tube with round corners extending in the left-right direction and an inner fixing part 24 in a cup shape formed integrally on the center part of the lower wall of the tubular part 22. The tubular part 22 and the inner fixing part 24 are integrally formed by press working, so that the upper end of the inner fixing part 24 is connected to the lower wall of the tubular part 22, while the inner fixing part 24 opens to the inner peripheral space of the tubular part 22. In each of the center of the upper wall of the tubular part 22 and the center of the inner fixing part 24, a hole with a circular shape is formed penetrating therethrough in the up-down direction.

The second mounting member 18 is a rigid member like the first mounting member 16, which integrally includes an annular outer fixing part 26 and a tubular connecting part 28 that extends out downward from the outer fixing part 26. Also, on the second mounting member 18, a pair of guide parts 30, 30 are integrally formed to protrude outward in the front-back direction from the outer fixing part 26. This guide part 30 extends in the left-right direction with a cross sectional shape corresponding to a guide groove 80 described later. Regarding the guide part 30, the upper surface is an inclined surface that is tilted downward gradually relative to a horizontal surface toward the right side, while the lower surface is a plane surface which is not inclined relative to the horizontal surface, so that the guide part 30 becomes smaller toward the right side in the up-down dimension. Moreover, on the guide part 30, a swage pin 32 is integrally formed protruding to the right side.

The first mounting member 16 and the second mounting member 18 is disposed separately from each other in the up-down direction roughly on the same central axis and connected to each other elastically by the main rubber elastic body 20. The main rubber elastic body 20 has an approximate shape of a truncated cone with a thick wall and a large diameter. The edge part of the main rubber elastic body 20 on the small diameter side is bonded by vulcanization to the inner fixing part 24 of the first mounting member 16, while the edge part of the main rubber elastic body 20 on the large diameter side is bonded by vulcanization to the outer fixing part 26 of the second mounting member 18. In this embodiment, the main rubber elastic body 20 is also bonded to the inner peripheral side of the inner fixing part 24, so that the inner fixing part 24 is fixed to the main rubber elastic body 20 as buried therein. Additionally, in the diametrical center part of the main rubber elastic body 20, a liquid injection hole 33 is formed extending in the up-down direction. This liquid injection hole 33 opens to the inner peripheral space of the tubular part 22 of the first mounting member 16 at its upper end, while penetrating through the lower wall of the inner fixing part 24 of the first mounting member 16 so as to open to the lower surface of the main rubber elastic body 20 at its lower end. The main rubber elastic body 20 takes the form of an integrally vulcanization molded component incorporating the first mounting member 16 and the second mounting member 18.

Also, in the main rubber elastic body 20, a large-diameter recess 34 is formed with a substantial shape of an inverted bowl opening to the edge surface on the large diameter side. Owing to this, the main rubber elastic body 20 has a shape including rubber legs extending in the directions where the inner fixing part 24 and the outer fixing part 26 faces each other in the longitudinal cross section. The lower end of the liquid injection hole 33 of the main rubber elastic body 20 opens to the upper base wall surface of the large-diameter recess 34.

Moreover, in this embodiment, for the tubular part 22 of the first mounting member 16, the inner peripheral surface is covered with a fitting rubber layer 36 formed integrally with the main rubber elastic body 20, while the outer peripheral surface is covered with a buffering rubber layer 38 formed integrally with the main rubber elastic body 20. Furthermore, for the second mounting member 18, the connecting part 28 is covered with a sealing rubber 40 as a seal body formed integrally with the main rubber elastic body 20, while the guide part 30 is covered with a covering rubber 42 formed integrally with the main rubber elastic body 20 on the upper, lower, front and back surfaces. The upper surface of the buffering rubber layer 38 bonded on the upper surface of the tubular part 22 (an upper end surface 110 of the mount main unit 12 described later) is an inclined surface that is tilted downward toward the both outer sides in the left-right direction.

In addition, to the second mounting member 18, the cup member 44 as a compression member is mounted. The cup member 44 is a member formed of a synthetic resin etc, roughly in a shape of a bottomed circular tube as a whole, and the bottom wall has a passage hole 46 formed penetrating therethrough in the up-down direction. Moreover, the peripheral wall of the cup member 44 has a step at the middle part in the up-down direction so that the upper part of the step has a larger diameter than the lower part thereof. The cup member 44 is mounted to the second mounting member 18 by the upper part of its peripheral wall with a large diameter being externally fitted onto the connecting part 28 of the second mounting member 18, whereby the cup member 44 is disposed on a side opposite to the first mounting member 16 (the lower side) of the second mounting member 18. For the upper edge part of the peripheral wall of the cup member 44, a reinforcing part 47 is integrally provided along its entire length to protrude toward the outer periphery, thereby stabilizing the form of the cup member 44.

Also, to the second mounting member 18 and the cup member 44, a flexible film 48 and a partition member 50 are attached. The flexible film 48 is formed of an elastomer including a rubber and has a substantial shape of a thin circular plate as a whole and slack in the up-down direction. The flexible film 48 is mounted to the second mounting member 18 and the cup member 44 by an outer peripheral sealing part 49 as a seal body provided on its outer peripheral rim being clamped between the bottom wall of the cup member 44 and the partition member 50 described later in the up-down direction, in order to close off the passage hole 46 of the cup member 44 fluid-tightly. As a result, formed between the main rubber elastic body 20 and the flexible film 48 is a fluid chamber 52 for which a portion of the wall is constituted by the main rubber elastic body 20 and another portion of the wall is constituted by the flexible film 48, with a non-compressible fluid sealed therein. The non-compressible fluid sealed in the fluid chamber 52 is not especially limited. However, preferably adopted as the fluid is water, ethylene glycol, alkylene glycol, polyalkylene glycol, silicone oil, or a mixture liquid of them. Moreover, the non-compressible fluid sealed in the fluid chamber 52 is desired to be a low-viscosity fluid having viscosity of 0.1 Pa·s or lower, so as to advantageously obtain vibration-damping effect owing to an orifice passage 76 described later and the like.

The partition member 50 has a substantial shape of a circular plate as a whole and has a structure including an upper partition member 54, a lower partition member 56 and a movable film 58 disposed therebetween. The upper partition member 54 is a rigid member formed of a metal or a synthetic resin, wherein the center part has a circular central recess 60 opening upward, while the outer peripheral rim has an upper peripheral groove 62 that opens to the outer peripheral surface and extends in the peripheral direction with a length less than one periphery. Meanwhile, the lower partition member 56 is a rigid member like the upper partition member 54, wherein the center part has a circular housing recess 64 opening upward, while the outer peripheral part has a lower peripheral groove 66 that opens to the upper surface and extends in the peripheral direction with a length less than one periphery. The lower partition member 56 has a larger diameter than that of the upper partition member 54. Such partition members are configured to have the lower peripheral groove 66 and the upper peripheral groove 62 be in roughly the same diametrical position while having the outer peripheral rim of the lower partition member 56 be positioned on the outer peripheral side relative to the upper peripheral groove 62, in a state described later where the upper partition member 54 and the lower partition member 56 are superposed to each other in the up-down direction.

The upper partition member 54 and the lower partition member 56 are superposed to one another in the up-down direction, whereby the opening part of the housing recess 64 is covered by the upper partition member 54 to form a housing space, and the movable film 58 is arranged in the housing space. The movable film 58 is a member formed of an elastomer including a rubber roughly in a circular plate shape. In the movable film 58, the outer peripheral rim includes a clasped part that protrudes to both sides in the thickness direction and extends peripherally in an annular shape, while the inner peripheral part integrally includes ribs that protrude to both sides in the thickness direction and extend in a radial fashion. This movable film 58 is arranged in the housing recess 64 of the lower partition member 56 and disposed between the upper partition member 54 and the lower partition member 56 superposed to one another in the up-down direction. In addition, an upper through hole 68 formed penetrating through the bottom wall of the central recess 60 in the upper partition member 54 and a lower through hole 70 formed penetrating through the bottom wall of the housing recess 64 in the lower partition member 56 have the movable film 58 exposed to the outside of the upper and lower partition members 54 and 56.

The partition member 50 with this structure is disposed in the fluid chamber 52. More specifically, the upper partition member 54 is inserted into the connecting part 28 of the second mounting member 18, while the lower partition member 56 is inserted into the lower part of the peripheral wall of the cup member 44, so that the upper and lower partition members 54 and 56 are disposed between the second mounting member 18 and the cup member 44 in the up-down direction. Also, the outer peripheral part of the lower partition member 56 is overlapped with the outer peripheral sealing part 49 of the flexible film 48, so that the outer peripheral sealing part 49 is clamped between the lower partition member 56 and the bottom wall of the cup member 44 in the up-down direction.

Moreover, by the partition member 50 being disposed in the fluid chamber 52, the fluid chamber 52 is divided into two on the upper and lower sides of the partition member 50. Formed on the upper side of the partition member 50 is a pressure-receiving chamber 72 whose wall is partially constituted by the main rubber elastic body 20, while formed on the lower side of the partition member 50 is an equilibrium chamber 74 whose wall is partially constituted by the flexible film 48.

Furthermore, the upper peripheral groove 62 of the upper partition member 54 is covered by the connecting part 28 of the second mounting member 18, while the lower peripheral groove 66 of the lower partition member 56 is covered by the upper partition member 54. Additionally, the upper peripheral groove 62 and the lower peripheral groove 66 are connected to each other at their peripheral ends. Thus, a passage in the form of a tunnel is formed extending in the peripheral direction with a length less than two peripheries. Owing to this, since one end of the tunnel-shaped passage is connected to the pressure-receiving chamber 72 while the other end thereof is connected to the equilibrium chamber 74, the orifice passage 76 is formed to connect the pressure-receiving chamber 72 and the equilibrium chamber 74 to one another. For the orifice passage 76, by setting the ratio of the passage cross sectional area A to the passage length L (A/L) as appropriate considering the wall spring rigidity of the fluid chamber 52, the resonance frequency of the non-compressible fluid flowing through the passage (the tuning frequency) is adjusted to a low frequency of about 10 Hz corresponding to engine shake.

Also, the liquid pressure of the pressure-receiving chamber 72 is applied to the upper surface of the movable film 58 via the upper through hole 68, while the liquid pressure of the equilibrium chamber 74 is applied of the lower surface of the movable film 58 via the lower through hole 70, and the movable film 58 can be subject to elastic deformation in the up-down direction based on the liquid pressure difference between the pressure-receiving chamber 72 and the equilibrium chamber 74. The resonance frequency of the movable film 58 is adjusted so that the movable film 58 undergoes deformation in a resonant state upon input of a vibration with higher frequency than the tuning frequency of the orifice passage 76. In the present embodiment, the resonance frequency of the movable film 58 is tuned to a level of some dozen Hz corresponding to idling vibration.

Used in the present embodiment is a later fluid-injected structure wherein an integrally vulcanization molded component of the main rubber elastic body 20, the cup member 44, the flexible film 48 and the partition member 50 are combined, before the non-compressible fluid is injected into the fluid chamber 52. Specifically, after combining all the aforementioned components, a not-shown nozzle is inserted into the liquid injection hole 33 of the main rubber elastic body 20, and a prescribed amount of the non-compressible fluid is injected into the fluid chamber 52 from the nozzle. Also, after completion of the injection of the non-compressible fluid into the fluid chamber 52, a spherical plug member 77 is fitted into the liquid injection hole 33 to close off the liquid injection hole 33 in a fluidtight manner, thereby sealing the non-compressible fluid in the fluid chamber 52. However, the mount main unit 12 is not limited to the later fluid-injected structure. For example, by performing the combination work of all the aforesaid components in a cistern filled with the non-compressible fluid, it is also possible to seal the non-compressible fluid simultaneously with the assembly of all the components.

Figure 7:
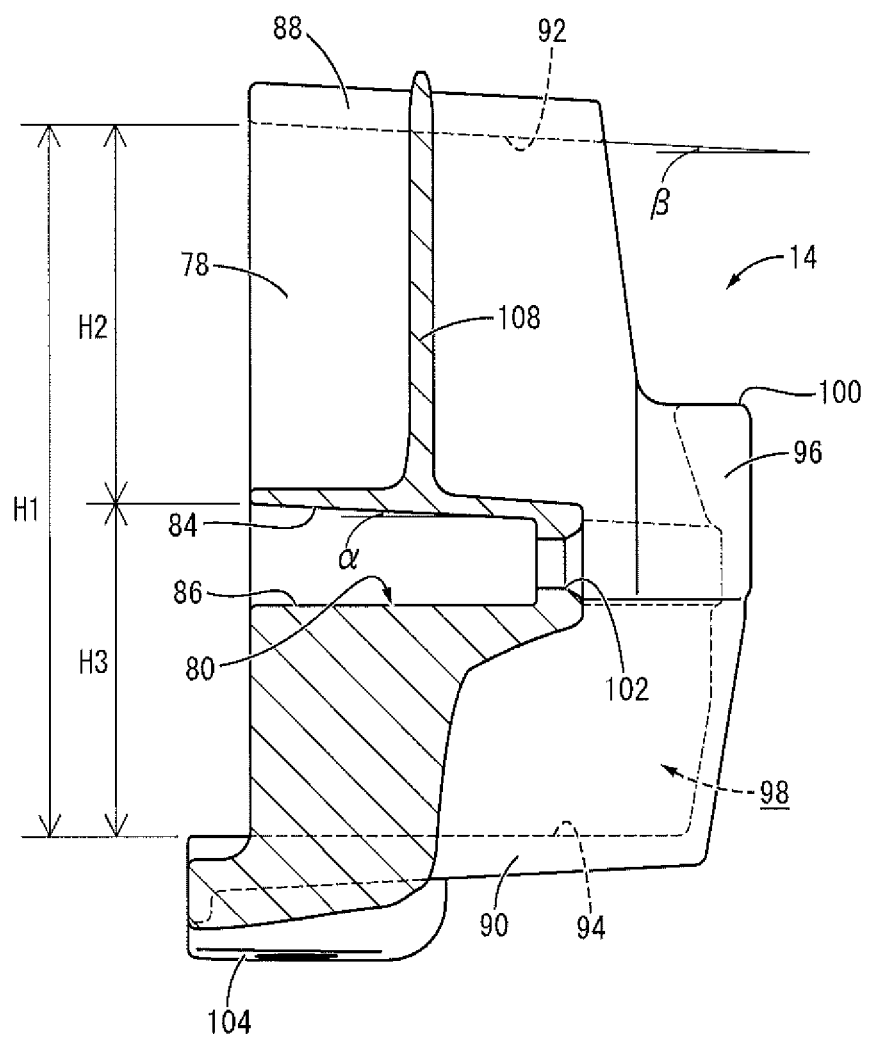
FIG. 7 is a cross sectional view taken along line 7-7 of FIG. 5.

To the mount main unit 12 having such a structure, the bracket 14 is mounted. The bracket 14 is a high rigidity member formed of a metal, a synthetic resin or the like, including a pair of opposite walls 78, 78 disposed facing each other in the front-back direction, as shown in FIGS. 5 and 6. Each of the pair of opposite walls 78, 78 includes the guide groove 80 that opens inward in the facing direction and extends in the left-right direction. This guide groove 80 has a shape of a groove approximately corresponding to the guide part 30 of the second mounting member 18. Also, in the guide groove 80 of this embodiment, toward the right side that is the direction of insertion of the mount main unit 12 into the bracket 14 described later, as shown in FIG. 6, a front-back groove depth inner surface 82 is a tilted surface that is tilted inward in the front-back direction. Meanwhile, as shown in FIG. 7, an upper groove width inner surface 84 is a tilted surface that is tilted downward relative to the horizontal surface at an angle of α. A lower groove width inner surface 86 of the guide groove 80 is a plane surface that expands substantially in the horizontal direction as shown in FIG. 7. As a result, the upper groove width inner surface 84 and the lower groove width inner surface 86 approach one another toward the right side and the groove width of the guide groove 80 gets smaller toward the right side.

Additionally, the pair of opposite walls 78, 78 are connected to each other, at their upper edge parts by an upper compression wall 88 formed integrally therewith, and at their lower edge parts by a lower compression wall 90 formed integrally therewith. The upper compression wall 88 and the lower compression wall 90 are disposed opposite in the up-down direction, and their opposite surfaces are an upper compression wall surface 92 and a lower compression wall surface 94 as compression wall surfaces. The upper compression wall surface 92 and the lower groove width inner surface 86 of the guide groove 80 are opposite surfaces disposed on the side opposite to one another in the up-down direction, and so are the lower compression wall surface 94 and the upper groove width inner surface 84 of the guide groove 80. Additionally, the upper compression wall surface 92 is a tilted surface that is tilted downward relative to the horizontal surface at an angle of β toward the right side that is the direction of insertion of the mount main unit 12 into the bracket 14 described later, while the lower compression wall surface 94 is a plane surface that expands roughly in the horizontal direction. Accordingly, the upper compression wall surface 92 and the lower groove width inner surface 86 are tilted relative to each other, while the lower compression wall surface 94 and the upper groove width inner surface 84 are tilted relative to each other. In the lower compression wall 90, a circular hole 95 is formed therethrough in the up-down direction.

In addition, at the right edge of the pair of opposite walls 78, 78 and the upper and lower compression walls 88, 90, a vertical wall 96 is integrally formed, so that a recess-shaped mounting space 98 is formed opening to the left side and surrounded by the pair of opposite walls 78, 78, the upper and lower compression walls 88, 90 and the vertical wall 96. In the upper portion of the vertical wall 96, a window 100 is formed penetrating in the left-right direction, whereby the upper side of the mounting space 98 opens to the right side via the window 100. Moreover, the vertical wall 96 has a curved shape corresponding to the outer peripheral surface of the mount main unit 12, at least in the lower portion. Furthermore, at a part of the vertical wall 96 that closes the right end of the guide groove 80, a swage hole 102 is formed penetrating therethrough in the left-right direction with a cross sectional shape corresponding to the swage pin 32 of the second mounting member 18.

Also, in each of the lower edge parts of the pair of opposite walls 78, 78, an attachment piece 104 is formed protruding outward in the front-back direction. The attachment piece 104 has a plate shape and includes a bolt hole 106 penetrating therethrough roughly in the up-down direction. Moreover, in the front end part of the attachment piece 104, a reinforcing plate 108 is integrally formed expanding between the attachment piece 104 and the opposite wall 78 across from one to the other, thereby improving the deformation rigidity of the bracket 14.

The bracket 14 is mounted to the mount main unit 12. Specifically, as shown in FIGS. 8A to 8E, the mount main unit 12 is inserted into the mounting space 98 of the bracket 14 in the lateral direction, and the mount main unit 12 is housed in the mounting space 98 of the bracket 14. In this state, the mount main unit 12 is equipped with the bracket 14. Moreover, the pair of guide parts 30, 30 provided in the second mounting member 18 of the mount main unit 12 are fitted into the pair of guide grooves 80, 80 provided in the pair of opposite walls 78, 78 of the bracket 14 in the lateral direction, so as to attach the bracket 14 to the second mounting member 18 in a fixing way. In this embodiment, the covering rubber 42 is provided on the surfaces of the pair of guide parts 30, 30. Therefore, a dimensional error is allowed between the guide parts 30, 30 and the guide grooves 80, 80 owing to elastic deformation of the covering rubber 42, and the guide parts 30, 30 are rarely dislodged from the guide grooves 80, 80.

Furthermore, the swage pins 32 formed protruding on the pair of guide parts 30, 30 are inserted into the swage holes 102 of the vertical wall 96 provided at the right ends of the pair of guide grooves 80, 80, and the tip end parts of the swage pins 32 are fixed to the opening peripheral parts of the swage holes 102 by swaging. Thus, the separation (dislodgement) in the left-right direction of the second mounting member 18 and the bracket 14 is prevented by engagement between the swage pins 32 and the opening peripheral parts of the swage holes 102. Note that swaging process is one of processing methods for connecting a plurality of parts. In this embodiment, the swage pins 32 inserted in the swage holes 102 are subject to a plastic working like bending or crushing, whereby the swage pins 32 are engaged with the opening peripheral parts of the swage holes 102. As a result, the second mounting member 18 provided with the swage pins 32 and the bracket 14 provided with the swage holes 102 are fixed by swaging. According to this, the outer diameter of the swage pin 32 before swaging process can be made smaller than the inner diameter of the swage hole 102, thereby facilitating the insertion of the swage pin 32 into the swage hole 102, compared to the case of securing the swage pin 32 press-fit to the swage hole 102.

In the state of the engine mount 12 equipped with the bracket 14, a lower end surface 112 on the side of the cup member 44 in the mount main unit 12 is overlapped with the lower compression wall 90 of the bracket 14. However, since the circular hole 95 is formed through the lower compression wall 90 of the bracket 14, the deformation of the flexible film 48 is allowed owing to the passage hole 46 of the cup member 44 and the circular hole 95 of the bracket 14.

Here, the mount main unit 12 is compressed in the up-down direction in the state equipped with the bracket 14. In this embodiment, the main rubber elastic body 20 of the mount main unit 12 is compressed in the up-down direction in advance, and compression force in the up-down direction is applied between the second mounting member 18 and the cup member 44 of the mount main unit 12, thereby improving sealing performance of the wall of the fluid chamber 52.

Specifically, in the bracket 14, the upper compression wall surface 92 is a tilted surface that is tilted relative to the direction of insertion of the mount main unit 12 into the bracket 14, i.e., orthogonal to the central axis of the mount main unit, while the lower groove width inner surface 86 of the guide groove 80 is a horizontal surface that expands roughly parallel to the direction of insertion. Therefore, the upper compression wall surface 92 and the lower groove width inner surface 86 are tilted relative to each other, and gradually approach one another toward the direction of insertion (the right side). Also, the vertical distance between the lower groove width inner surface 86 of the guide groove 80 and the upper compression wall surface 92 of the bracket 14 in their positions in the state where the mount main unit 12 is attached to the bracket 14 is made smaller than the vertical distance between the lower surface of the guide part 30 and the upper end surface 110, which is the end surface on the side of the first mounting member 16, in the mount main unit 12 before being equipped with the bracket 14. As a result, the upper end surface 110 of the mount main unit 12 is superposed to the upper compression wall surface 92 in contact therewith, while the lower surface of the guide part 30 of the mount main unit 12 is superposed to the lower groove width inner surface 86 in contact therewith. Thus, in the state where the mount main unit 12 is equipped with the bracket 14, the first mounting member 16 and the second mounting member 18 of the mount main unit 12 are made to approach to one another in the up-down direction between the lower groove width inner surface 86 of the guide groove 80 and the upper compression wall surface 92 of the bracket 14. This applies the compression force in the up-down direction on the main rubber elastic body 20 in order to compress the main rubber elastic body 20 in advance in the up-down direction.

Additionally, since the upper compression wall surface 92 is a tilted surface, by inserting the mount main unit 12 into the bracket 14 toward the right side while abutting the upper end surface 110 of the mount main unit 12 to the upper compression wall surface 92 of the bracket 14, the compression amount in the up-down direction of the main rubber elastic body 20 gradually gets greater. Owing to this, by completing the attachment of the bracket 14 on the mount main unit 12, the main rubber elastic body 20 can be subject to the target pre-compression in the up-down direction. In the present embodiment, the upper end surface 110 of the mount main unit 12 is a tilted surface that is tilted downward toward both outsides in the left-right direction, and the right half of the upper end surface 110 is tilted in the same direction as the upper compression wall surface 92 so as to abut to the upper compression wall surface 92.

Meanwhile, for the bracket 14, the upper groove width inner surface 84 of the guide groove 80 is a tilted surface that is tilted to the direction of insertion of the mount main unit 12 into the bracket 14, while the lower compression wall surface 94 is a horizontal surface that expands roughly parallel to the direction of insertion. Hence, the lower compression wall surface 94 and the upper groove width inner surface 84 are tilted relative to one another, and gradually approach each other toward the direction of insertion. Also, the vertical distance between the upper groove width inner surface 84 of the guide groove 80 and the lower compression wall surface 94 of the bracket 14 in their positions in the state where the mount main unit 12 is attached to the bracket 14 is made smaller than the vertical distance between the upper surface of the guide part 30 and the lower end surface 112, which is the end surface on the side of the cup member 44, in the mount main unit 12 before being equipped with the bracket 14. Thus, the lower end surface 112 of the mount main unit 12 is superposed to the lower compression wall surface 94 in contact therewith, while the upper surface of the guide part 30 of the mount main unit 12 is superposed to the upper groove width inner surface 84 in contact therewith. Therefore, in the state where the mount main unit 12 is mounted on the bracket 14, the second mounting member 18 and the cup member 44 of the mount main unit 12 are made to approach one another in the up-down direction between the upper groove width inner surface 84 of the guide groove 80 and the lower compression wall surface 94 of the bracket 14. As a result, the sealing rubber 40 disposed between the second mounting member 18 and the partition member 50, the outer peripheral sealing part 49 of the flexible film 48 disposed between the partition member 50 and the cup member 44 and the like are compressed in the up-down direction so as to seal with a higher level between all the components constituting the wall of the fluid chamber 52, namely the second mounting member 18, the partition member 50, and the cup member 44.

Moreover, since the upper groove width inner surface 84 of the guide groove 80 is a tilted surface, by inserting the mount main unit 12 into the bracket 14 toward the right side while abutting the upper surface of the guide part 30 of the mount main unit 12 to the upper groove width inner surface 84 of the bracket 14, the compression amount in the up-down direction of the sealing rubber 40 and the outer peripheral sealing part 49 gradually gets greater. Owing to this, by completing the attachment of the bracket 14 on the mount main unit 12, the target sealing of the fluid chamber 52 is realized.

In this embodiment, the mount main unit 12 before being equipped with the bracket 14 is in a temporarily sealed state such that sealing is secured to a certain extent between all the components constituting the wall of the fluid chamber 52, namely the second mounting member 18, the partition member 50, and the cup member 44. In such a mount main unit 12, the non-compressible fluid is filled in the fluid chamber 52 before the bracket 14 is mounted thereto. However, it is not always necessary that the sealing be secured in the wall of the fluid chamber 52 before the bracket 14 is attached to the mount main unit 12, and the sealing can be secured owing to the attachment of the bracket 14. In this case etc., it is possible to fill the non-compressible fluid into the fluid chamber 52 after the bracket 14 is attached to the mount main unit 12.

Also, in this embodiment, the vertical distance H1 between the upper compression wall surface 92 and the lower compression wall surface 94 in the opening side end of the mounting space 98 (the left end) in the bracket 14 (see FIG. 7) is made greater than the vertical dimension h1 in the right end of the mount main unit 12 (see FIG. 4) (H1>h1). Moreover, the vertical distance H2 between the upper compression wall surface 92 and the upper groove width inner surface 84 in the left end of the bracket 14 is made greater than the vertical dimension h2 from the upper end of the covering rubber 42 to the upper end of the mount main unit 12 in the right end position of the guide part 30 (H2>h2). Furthermore, the vertical distance H3 between the lower compression wall surface 94 and the upper groove width inner surface 84 in the left end of the bracket 14 is made greater than the vertical dimension h3 from the upper end of the covering rubber 42 to the lower end of the mount main unit 12 in the right end position of the guide part 30 (H3>h3). As a result, the mount main unit 12 can be easily inserted into the mounting space 98 of the bracket 14. Also, the mount main unit 12 can be inserted into the bracket 14 without applying the compression force in the up-down direction to the mount main unit 12 in advance especially.

In the engine mount 10 according to this embodiment, the guide part 30 of the second mounting member 18 is inserted into the guide groove 80 in a recessed groove shape including the upper groove width inner surface 84 and the lower groove width inner surface 86, whereby the second mounting member 18 is positioned relative to the bracket 14 in the up-down direction. Accordingly, vertical pre-compression amount of the main rubber elastic body 20 is set with the vertical distance between the upper compression wall surface 92 and the lower groove width inner surface 86 in the bracket 14. Meanwhile, vertical relative displacement amount between the second mounting member 18 and the cup member 44, namely vertical compression deformation amount of the sealing rubber 40 and the outer peripheral sealing part 49 which seal the wall of the fluid chamber 52, is set with the vertical distance between the lower compression wall surface 94 and the upper groove width inner surface 84 in the bracket 14. Thus, the vertical pre-compression amount of the main rubber elastic body 20 and the vertical relative displacement amount between the second mounting member 18 and the cup member 44 can be set separately from each other. Accordingly, it is possible to excellently and stably obtain the target vibration-damping characteristics, durability and reliability.

Additionally, the engine mount 10 has a structure where only the guide part 30 with the covering rubber 42 on its surface is inserted into the guide groove 80. With this structure, it is possible to have a higher accuracy for the vertical dimension of the part to be inserted into the guide groove 80, by comparison to a structure wherein a plurality of components overlapped in the up-down direction are inserted into and clamped by the guide groove 80, for example. As a result, the second mounting member 18 is positioned in relation to the bracket 14 in the up-down direction precisely. This makes it possible to set each of the pre-compression amount of the main rubber elastic body 20 and the vertical relative displacement amount between the second mounting member 18 and the cup member 44 with a high accuracy.

In this embodiment, the tilted angle $\alpha$ of the upper groove width inner surface 84 of the bracket 14 relative to the horizontal surface is roughly the same as the tilted angle $\beta$ of the upper compression wall surface 92 relative to the horizontal surface. However, since the upper end surface 110 of the mount main unit 12 protrudes to the right side of the guide part 30, the pre-compression of the main rubber elastic body 20 and the sealing of the fluid chamber 52 are realized simultaneously. Also, in the case where $\alpha<\beta$, when the mount main unit 12 is inserted into the mounting space 98 of the bracket 14, the guide part 30 is pressed downward by abutment to the upper groove width inner surface 84 of the guide groove 80, while the upper end surface 110 of the mount main unit 12 is pressed downward by abutment to the upper compression wall surface 92, whereby the pre-compression of the main rubber elastic body 20 and the sealing of the fluid chamber 52 are realized simultaneously.

Also, since the pre-compression of the main rubber elastic body 20 and improvement in the sealing of the fluid chamber 52 are realized by assembly of the bracket 14 in relation to the mount main unit 12, it is possible to attain the target performance without requiring special pre-compression step and sealing step. In addition, the tilted surface of the bracket 14 is used to exert the compression force in the up-down direction on the mount main unit 12. Therefore, upon inserting the mount main unit 12 into the bracket 14, a complex work like insertion with vertical force application on the mount main unit 12 is not required, thereby obtaining easiness in manufacture.

Additionally, in this embodiment, since the lower compression wall surface 94 of the bracket 14 is a plane surface without inclination, the lower end surface 112 on the side of the cup member 44 to be overlapped with the lower compression wall surface 94 is not tilted, and the cup member 44 is a rotation body with a roughly fixed cross sectional shape in the peripheral direction. Therefore, upon attachment of the cup member 44 to the second mounting member 18, the peripheral orientation regarding the second mounting member 18 and the cup member 44 is discretionarily determined, whereby the attachment is facilitated. In addition, this avoids variation in sealing performance due to the orientation difference for the cup member 44 and the bracket 14, so that the target reliability can be attained stably.

Also, since the upper compression wall surface 92 and the upper groove width inner surface 84 of the bracket 14 are tilted surfaces, in manufacture of the bracket 14 by molding, it is possible to easily remove the mold from the molded product in the left-right direction. Especially in the present embodiment, the front-back groove depth inner surface 82 of the guide groove 80 is also tilted to the direction of mold removal, thereby further facilitating the mold removal from the molded product.

The engine mount 10 is interposed between a not-shown power unit and the vehicle body which are constituent components of the vibration transmission system so that these power unit and vehicle body are connected to each other by the engine mount 10 in a vibration-damping manner. Specifically, the engine mount 10 is configured such that a not-shown inner bracket is secured press-fit in the tubular part 22 of the first mounting member 16, whereby the first mounting member 16 is attached to the power unit via the inner bracket. Meanwhile, in the configuration, the attachment pieces 104, 104 of the bracket 14 are attached to the vehicle body by attachment bolts that are not shown being inserted into the bolt holes 106, 106, so that the second mounting member 18 is attached to the vehicle body via the bracket 14.

In this state of the engine mount 10 being mounted on the vehicle, when a low-frequency, large-amplitude vibration corresponding to engine shake is input between the first mounting member 16 and the second mounting member 18, relative pressure fluctuation between the pressure-receiving chamber 72 and the equilibrium chamber 74 generates a fluid flow through the orifice passage 76, thereby exhibiting vibration-damping effect owing to fluid flowing action. On the other hand, when a high-frequency, small-amplitude vibration corresponding to idling vibration is input between the first mounting member 16 and the second mounting member 18, relative pressure fluctuation between the pressure-receiving chamber 72 and the equilibrium chamber 74 makes the movable film 58 undergo elastic deformation in the up-down direction, in order to exert vibration-damping effect owing to liquid pressure absorption action.

Moreover, in the state where a distributed load of the power unit is input in the up-down direction between the first mounting member 16 and the second mounting member 18, the inner bracket that protrudes from the tubular part 22 of the first mounting member 16 toward the right side via the window 100 of the bracket 14 is opposite to the upper edge of the vertical wall 96 (the lower edge of the window 100) in the up-down direction. In the same state, the upper end surface 110 of the mount main unit 12 is separate downward from the upper compression wall surface 92 of the bracket 14. Thus, an stopper in the up-down direction is constituted that limits relative displacement amount in the up-down direction between the first mounting member 16 and the second mounting member 18, owing to abutment between the inner bracket and the vertical wall 96 of the bracket 14 via the buffering rubber layer 38 as well as abutment between the upper end surface 110 of the mount main unit 12 and the upper compression wall surface 92 of the bracket 14. Additionally, a stopper in the front-back direction is constituted that limits relative displacement amount in the front-back direction between the first mounting member 16 and the second mounting member 18, owing to abutment via the buffering rubber layer 38 between each of the both front-back outer surfaces of the tubular part 22 of the first mounting member 16 and the respective one of the pair of opposite walls 78, 78 of the bracket 14. These stoppers restrict elastic deformation amount of the main rubber elastic body 20, thereby enhancing the durability of the main rubber elastic body 20.

Although the embodiment of the present invention is described above, this invention is not limited by the specific descriptions. For example, in the aforesaid embodiment, the upper compression wall surface 92 of the bracket 14 is tilted relative to the direction of insertion of the mount main unit 12 into the bracket 14, while the lower groove width inner surface 86 is not tilted. However, it is possible to use such a structure that the upper compression wall surface 92 is not tilted and the lower groove width inner surface 86 is tilted, or such a structure that both the upper compression wall surface 92 and the lower groove width inner surface 86 are tilted. The same goes for the lower compression wall surface 94 and the upper groove width inner surface 84, that is, either can be a tilted surface and both can be tilted surfaces.

In addition, an embodiment is allowable if it includes only one of the relative inclination of the upper compression wall surface 92 and the lower groove width inner surface 86 and the relative inclination of the lower compression wall surface 94 and the upper groove width inner surface 84. Specifically, in the case of applying this invention to a so-called solid type of vibration-damping device without a fluid-filled structure for example, it is possible to apply only the pre-compression of the main rubber elastic body 20 owing to the relative inclination of the upper compression wall surface 92 and the lower groove width inner surface 86. In this case, the relative inclination of the lower compression wall surface 94 and the upper groove width inner surface 84 can be unnecessary. In the aforesaid structure shown as an example, it is also possible to omit the lower compression wall 90 that constitutes the lower compression wall surface 94 in the bracket 14.

Also, in the above-described embodiment, the tilted angles of the upper compression wall surface 92 and the upper groove width inner surface 84 are substantially constant. However, the tilted angle can vary. For example, it is possible to have the tilted angles of those surfaces grow larger gradually toward the direction of insertion, with the aim of making a force required in the initial period of insertion small.

Moreover, although the fixation by swage between the second mounting member 18 and the bracket 14 with the swage pins 32 and the swage holes 102 is preferable for prevention of separation of these second mounting member 18 and bracket 14, it is not essential but can be omitted.

What is claimed is:

1. A bracket-equipped vibration-damping device comprising:
   a vibration-damping device main unit comprising:
      a first mounting member and a second mounting member being disposed separately from each other vertically; and
      a main rubber elastic body elastically connecting the first mounting member and the second mounting member to each other; and a bracket mounted to the vibration-damping device main unit in a state that the bracket is fixed to the second mounting member, which is inserted into the bracket in a lateral direction, wherein the second mounting member has a guide part, while the bracket has a guide groove extending in a direction of insertion of the second mounting member into the bracket, and the guide part is inserted into the guide groove in order to be positioned vertically, and the bracket includes a compression wall surface which is superposed to at least one of upper and lower end surfaces of the vibration-damping device main unit, and a groove width inner surface of the guide groove on an opposite vertical side to the compression wall surface is tilted relative to the compression wall surface so that the groove width inner surface of the guide groove and the compression wall surface approach each other vertically toward the direction of insertion of the second mounting member into the bracket.

2. The bracket-equipped vibration-damping device according to claim 1, wherein the groove width inner surface of the guide groove is tilted relative to the direction of insertion of the second mounting member into the bracket so as to approach the compression wall surface positioned on the opposite vertical side toward the direction of insertion, while a surface of the guide part corresponding to the groove width inner surface of the guide groove is tilted in the same direction as the groove width inner surface of the guide groove.

3. The bracket-equipped vibration-damping device according to claim 1, further comprising a covering rubber bonded on a surface of the guide part.

4. The bracket-equipped vibration-damping device according to claim 1, wherein the guide part of the second mounting member includes a swage pin protruding in the direction of insertion, while the guide groove of the bracket includes a swage hole corresponding to the swage pin in an insertion end wall of the guide groove, and a tip part of the swage pin is fixed to an opening peripheral part of the swage hole by swaging with the swage pin being inserted in the swage hole.

5. The bracket-equipped vibration-damping device according to claim 1, wherein the vibration-damping device main unit further comprises: a fluid chamber whose wall is partially constituted by the main rubber elastic body with a non-compressible fluid sealed therein; and a compression member disposed on a vertical side of the second mounting member opposite to the first mounting member, the groove width inner surface in the guide groove of the bracket on a side of the first mounting member is tilted relative to the direction of insertion of the second mounting member into the bracket, while the compression wall surface on a side of the compression member expands in the direction of insertion, and the groove width inner surface of the guide groove and the compression wall surface approach each other toward the direction of insertion, and the vibration-damping device main unit is equipped with the bracket in a state that a lower end surface of the compression member that is the lower end surface of the vibration-damping device main unit is in contact with the compression wall surface so that a seal body disposed between the second mounting member and the compression member is clamped between the second mounting member and the compression member to constitute a seal structure of the fluid chamber.

6. The bracket-equipped vibration-damping device according to claim 1, wherein the compression wall surface of the bracket on a side of the first mounting member is tilted relative to the direction of insertion of the second mounting member into the bracket so as to approach the groove width inner surface of the guide groove on an opposite side to the first mounting member toward the direction of insertion of the second mounting member into the bracket, and the vibration-damping device main unit is equipped with the bracket in a state that the upper end surface of the vibration-damping device main unit that is on the side of the first mounting member is in contact with the compression wall surface and the main rubber elastic body is compressed vertically in advance.

* * * * *